Patented July 30, 1940

2,209,902

UNITED STATES PATENT OFFICE 2,209,902

OIL SOLUBLE ACYLATED DYE

Anderson W. Ralston and Robert J. Vander Wal, Chicago, Ill., assignors to Armour and Company, Chicago, Ill., a corporation of Illinois No Drawing. Application February 17, 1938, Serial No. 191,112

12 Claims. (Cl. 260—208)

This invention relates to oil-solubilized dyes and it comprises, as new materials organic dyes which have been rendered soluble in organic solvents, or whose solubility in organic solvents has been increased, by incorporating in the dye molecule one or more acyl groups having the formula RCO— wherein R is a straight-chain alkyl radical containing at least eleven carbon atoms; and it further comprises processes wherein organic dyes are reacted with higher fatty acid chlorides in the presence of aluminum chloride by a Friedel-Crafts reaction and the intermediate aluminum chloride reaction product thus formed is hydrolyzed.

Organic dyes or coloring compounds used in the dyeing of fabrics, in textile printing pastes, and the like, are generally soluble in water or in acid or alkali solutions used in the dye baths. These organic dyes are either insoluble, or are but sparingly soluble in most organic liquids such, for example, as benzol, alcohol, chlorinated hydrocarbons, petroleum hydrocarbons, such as gasolene, kerosene and lubricating oils, solid or liquid waxes or wax compositions, soaps, plastics and the like. There are, of course, a few dyes available which can be added to gasolene for the purpose of imparting color thereto; or can be added to cosmetics, leather-coloring compounds, plastics and similar organic materials, but it is an observed fact that the number of so-called "oil-soluble" dyes is quite limited.

There is a large potential demand for organic coloring materials which can be used to color organic products of the general kinds referred to above. The azo and triphenylmethane classes of dyes contain hundreds of colors which would find immediate application in the coloring of organic products, other than those of vegetable or animal fibre origin, if they were soluble therein.

What is needed is some general method by which these generally oil-insoluble dyes can be rendered soluble, or, in the case of those which have some small degree of oil solubility, some method by which they can be rendered more soluble. By "oil solubility" we mean that the dye will dissolve in petroleum hydrocarbons, such as gasolene, kerosene, lubricating oils and even paraffin waxes. We also mean this term to embrace solubility in fats and fatty oils, such as linseed oil, and other vegetable oils, edible oils, such as cottonseed oil, and also in soaps of the vegetable or animal fatty acids. Consequently, the term "oil soluble" is used by us in a generic sense to distinguish from those dyes which are generally only soluble in water, or soluble in acid or alkaline solutions. The prior art also designates dyes as oil soluble as distinguished from those dyes which are not soluble in "oily" liquids and "waxy" or grease-like solid materials.

Our invention is based upon the discovery that organic dyes whose structural configuration contains one or more closed ring radicals having one or more replaceable hydrogen atoms thereon can be made to react with higher fatty acid chlorides by a typical Friedel-Crafts reaction to give derivatives wherein one or more of such hydrogens have been replaced by an acyl radical. Such derivatives can, in a sense, be defined broadly as ketonic since their structural configuration will contain a —COR group derived from the fatty acid chloride. By introducing acyl groups having at least eleven carbon atoms in the alkyl radical we render the dye oil soluble.

Thus, for example, if we start with a very simple dye, such as Chrysoidine, first precipitating the dye base from the hydrochloride by the addition of alkali and then reacting the dye base with stearyl chloride (stearic acid chloride) under Friedel-Crafts conditions we substitute stearyl groups for one or more of the hydrogen in the benzene rings of this dye base. The stearyl groups cause the dye to become soluble in solvents, such as benzene, alcohol, petroleum ether, gasolene and the like. To put it another way, our invention comprises incorporating acyl groups from higher fatty acids having at least twelve carbon atoms in normally oil insoluble dyes, or in those which are but sparingly oil soluble.

Our invention is broadly applicable to the preparation of acyl derivatives of any organic dye having hydrogens in a cyclic ring reactive with higher fatty acid chlorides. Thus, for example, we can form such acyl derivatives from the azo, triphenylmethane, and vat dyes. The only requirements are that there must be one or more reactive ring hydrogens capable of replacement by our particular acyl groups.

As acylating reagents we use any higher fatty acid chloride having at least twelve carbon atoms, or at least eleven carbon atoms in the alkyl group thereof. Generally, we find it advantageous to use stearyl chloride but our invention is not limited thereto because we can use as the acylating reagent lauryl chloride, myristyl chloride, palmityl chloride, arachidyl chloride, behenyl chloride, oleyl chloride and linolenyl chloride.

In the acylation of these dyes we use aluminum chloride as a condensing agent in conformity with the usual Friedel-Crafts procedure, and the reaction mixture is subjected to hydrolysis in the conventional way.

The oil solubility imparted to the dye or dye base will depend upon the proportion of the dye or dye base to the fatty acid chloride used. In other words, solubility increases as the number of acyl groups introduced increases. For this reason we find it advantageous to use a rather large molecular excess of the fatty acid chloride in each instance. Thus in some cases the amount of fatty acid chloride is five or ten times the molecular proportion of the dye so that a number of the acyl groups are substituted in the molecule. The ultimate products are, as stated, ketones or polyketones.

We shall now give examples of practising our invention:

Example 1

An orange monoazo dye, known commercially as Chrysoidine, is used. The formula for this dye is:

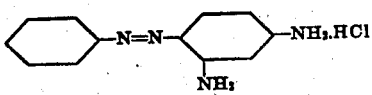

The dye base is obtained by precipitation with alkali from a water solution. 4.2 parts by weight of this base, 45 parts of stearyl chloride and 27 parts of aluminum chloride, together with 100 parts of dry carbon tetrachloride, are reacted together under the usual Friedel-Crafts conditions. The temperature is kept at about 40° C. for one hour, during which time the addition of the aluminum chloride is completed. The reaction mixture is then hydrolyzed with ice and the product steam distilled to remove the solvent and complete the hydrolysis. The product is then extracted with sodium hydroxide solution to remove any stearic acid formed during the reaction. The product is finally crystallized from alcohol containing hydrochloric acid which purifies the dye base and at the same time converts it to its hydrochloride. The probable formula for the product is as follows, R being $C_{17}H_{35}$.

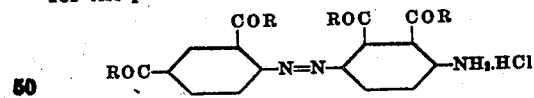

This product is soluble in benzene, alcohol and petroleum ether and insoluble in water. The product has a waxy texture and solutions of it are strongly orange in color.

Example 2

A brown bisazo dye, Bismarck brown, is used. The formula for this dye is:

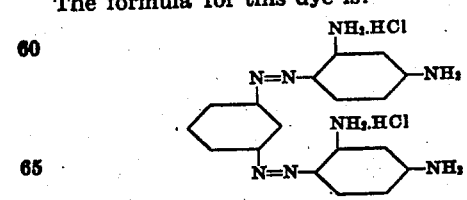

The free base is obtained by adding alkali to a water solution of the hydrochloride. 7 parts by weight of the dye base, 30 parts by weight of stearyl chloride, 14 parts by weight of aluminum chloride and 100 parts by weight of tetrachlorethane are reacted according to the conditions described under Example 1. The hydrolyzed product is a hard waxy solid soluble in benzene, carbon tetrachloride and alcohol. It is miscible with paraffin. Solutions of it are brown. The probable formula is as follows, R being $C_{17}H_{35}$.

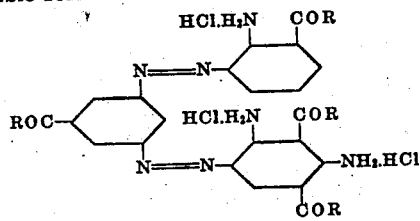

Example 3

A red triphenylmethane dye, p-fuchsine, is used. The formula for this dye is:

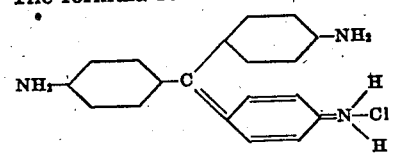

6 parts by weight of the p-fuchsine base, 12 parts stearyl chloride, 14 parts aluminum chloride and 100 parts tetrachlorethane are reacted according to the conditions described under Example 1. After hydrolysis the product is crystallized from alcohol and treated with an alcoholic solution of hydrochloric acid to form the monohydrochloride. The probable formula of this compound is as follows, R being $C_{17}H_{35}$.

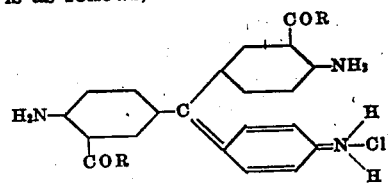

It is soluble in benzene, alcohol and petroleum ether and insoluble in water. The color in solution is red.

Example 4

A green triphenylmethane dry, Victoria Green W. B., is used. The formula for this dye is as follows:

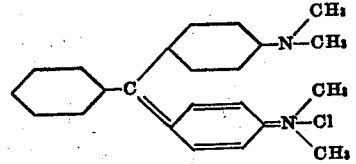

5 parts by weight of the dye base, 45 parts of stearyl chloride, 20 parts of aluminum chloride and 50 parts of tetrachlorethane are reacted at a temperature of 35–40° C. according to the procedure as described under Example 1. The final product after conversion to the hydrochloride is a gray-green powder soluble in alcohol, stearic acid and acetone to give a blue-green solution. It is colorless in melted paraffin but turns green upon cooling. The dye is insoluble in water. The probable formula of this dye is as follows, R being $C_{17}H_{35}$.

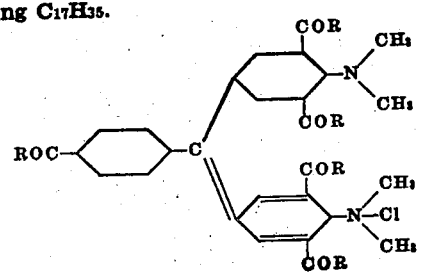

Example 5

A violet triphenylmethane dye, Methyl Violet 2B, is used. The formula for this dye is as follows:

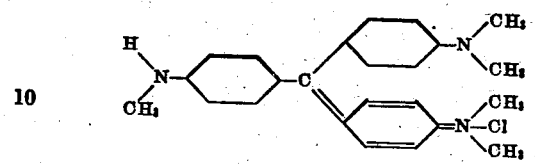

5 parts by weight of the dye base, 9 parts by weight of lauryl chloride, 6.5 parts of aluminum chloride and 100 parts of tetrachlorethane are reacted according to the conditions described under Example 1. The final product after conversion to the hydrochloride salt is a green waxy solid, soluble in benzene, alcohol, mineral oil and gasolene, to all of which it imparts an emerald green color. The product is insoluble in water. The color of the dye has apparently been changed during the reaction. The probable formula for this product is as follows, R being $C_{11}H_{23}$.

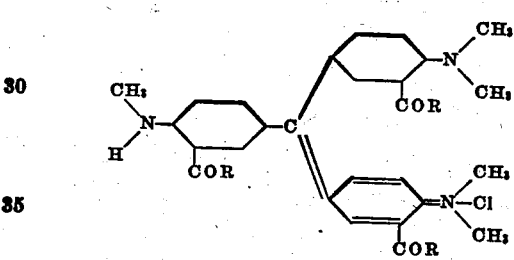

Example 6

A black nigrosine dye is used. The formula for this dye is as follows:

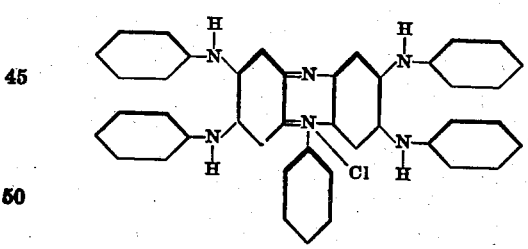

5 parts by weight of this dye, 15 parts of stearyl chloride, 10 parts of aluminum chloride and 100 parts of tetrachlorethane are reacted according to the conditions described under Example 1. After hydrolysis the product is dissolved in petroleum ether, the solution filtered and the solvent evaporated. The product is a black waxy solid soluble in benzene, petroleum ether and kerosene. It is slightly soluble in alcohol and completely insoluble in water. Its probable formula is as follows, R being $C_{17}H_{35}$.

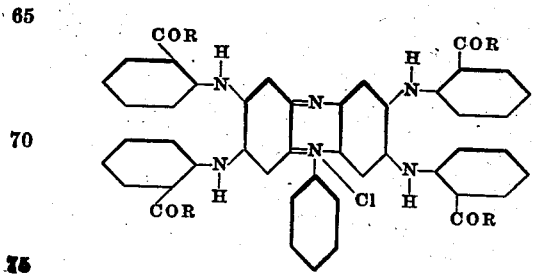

Example 7

A red azine dye, phenosafranine, is used. The formula for this dye is as follows:

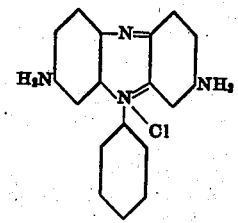

6.4 parts of the dye base, 15 parts of stearyl chloride, 15 parts of aluminum chloride and 100 parts of tetrachlorethane are reacted as above described. The product is a red solid soluble in alcohol, benzene and petroleum ether to which it imparts a red color. The probable formula is as follows, R being $C_{17}H_{35}$.

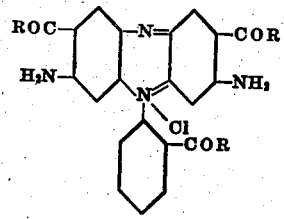

Example 8

A yellow acridine dye, proflavine, is used. The formula for this dye is as follows:

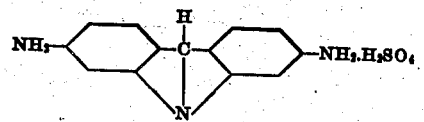

The free base is obtained as previously described. 4 parts of the dye base, 30 parts of stearyl chloride, 21 parts of aluminum chloride and 100 parts of tetrachlorethane are reacted as previously described. The product after conversion to the hydrochloride is soluble in alcohol, petroleum ether and benzene. Its probable formula is as follows, R being $C_{17}H_{35}$.

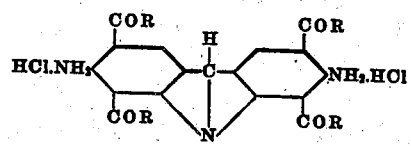

We have given the above examples to show the general applicability of our process to the conversion of water soluble dyes in general to give dyes which are oil soluble. And in the case of those dyes which are moderately oil soluble their solubility is greatly increased by acylating the dye in the manner stated.

Having thus described our invention, what we claim is:

1. The process of preparing an oil soluble derivative of an aromatic dye containing chromophoric groups and having at least one nuclear aromatic nucleus containing at least one hydrogen atom replaceable by an acyl group which comprises reacting such a dye with a fatty acid chloride having at least twelve carbon atoms in the presence of a Friedel-Crafts catalyst, hydrolyzing the intermediate Friedel-Crafts reaction product thus formed, and recovering a dye soluble in aliphatic hydrocarbon oils and containing at least one acyl group having at least twelve carbon atoms substituted for at least one of said replaceable hydrogen atoms.

2. The process as in claim 1 wherein the fatty acid chloride is stearyl chloride.

3. The process as in claim 1 wherein the Friedel-Crafts catalyst is aluminum chloride.

4. The process as in claim 1 wherein the fatty acid chloride is stearyl chloride and the Friedel-Crafts catalyst is aluminum chloride.

5. The process of preparing an oil soluble azo dye which comprises reacting the dye with a fatty acid chloride containing at least twelve carbon atoms in the presence of a Friedel-Crafts catalyst, hydrolyzing the intermediate Friedel-Crafts reaction product, and recovering an azo dye soluble in aliphatic hydrocarbon oils and containing at least one acyl group having at least twelve carbon atoms substituted for one of the cyclic hydrogens of said azo dye.

6. The process as in claim 5 wherein the fatty acid chloride is stearyl chloride.

7. The process as in claim 5 wherein the Friedel-Crafts catalyst is aluminum chloride.

8. The process as in claim 5 wherein the fatty acid chloride is stearyl chloride and the Friedel-Crafts catalyst is aluminum chloride.

9. The process of preparing an oil soluble triphenylmethane dye which comprises reacting the dye with a fatty acid chloride containing at least twelve carbon atoms in the presence of a Friedel-Crafts catalyst, hydrolyzing the intermediate Friedel-Crafts reaction product, and recovering a triphenylmethane dye soluble in aliphatic hydrocarbon oils and containing at least one acyl group having at least twelve carbon atoms substituted for at least one of the cyclic hydrogen atoms in said dye.

10. The process as in claim 9 wherein the fatty acid chloride is stearyl chloride.

11. The process as in claim 9 wherein the Friedel-Crafts catalyst is aluminum chloride.

12. The process as in claim 9 wherein the fatty acid chloride is stearyl chloride and the Friedel-Crafts catalyst is aluminum chloride.

ANDERSON W. RALSTON.
ROBERT J. VANDER WAL.